US010396598B2

(12) United States Patent
Govindaraj et al.

(10) Patent No.: US 10,396,598 B2
(45) Date of Patent: Aug. 27, 2019

(54) METHODS AND APPARATUS FOR WIRELESS POWER AND COMMUNICATION TRANSFER

(71) Applicant: QUALCOMM Incorporated, San Diego, CA (US)

(72) Inventors: Arvind Govindaraj, San Diego, CA (US); William Henry Von Novak, III, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 291 days.

(21) Appl. No.: 15/273,564

(22) Filed: Sep. 22, 2016

(65) Prior Publication Data

US 2018/0083489 A1   Mar. 22, 2018

(51) Int. Cl.
*H02J 50/12* (2016.01)
*H02J 50/27* (2016.01)
(Continued)

(52) U.S. Cl.
CPC ............. *H02J 50/12* (2016.02); *H02J 7/025* (2013.01); *H02J 50/27* (2016.02); *H02J 50/80* (2016.02); *H02J 5/005* (2013.01); *H02J 50/10* (2016.02)

(58) Field of Classification Search
USPC .................................................. 307/104
See application file for complete search history.

(56) References Cited

U.S. PATENT DOCUMENTS 8,923,015 B2    12/2014   Madawala et al.
2013/0221913 A1  8/2013   Kim
(Continued)

FOREIGN PATENT DOCUMENTS

JP    WO2014112019    *  7/2014
WO   WO-2009065099 A2   5/2009
(Continued)

OTHER PUBLICATIONS

Lu X., et al., "Wireless Charging Technologies: Fundamentals, Standards, and Network Applications," IEEE Communications Surveys & Tutorials, 2015, pp. 1-41.
(Continued)

*Primary Examiner* — Rexford N Barnie
*Assistant Examiner* — Xuan Ly
(74) *Attorney, Agent, or Firm* — Polsinelli LLP

(57) ABSTRACT

An aspect of this disclosure is an apparatus for receiving power wirelessly. The apparatus comprises a power receiver circuit that receives power from a magnetic field of a transmitter to provide to a load. At least one receiver component is coupled with the power receiver circuit and operates based on at least one operation parameter. A sensor measures at least one of a current and a voltage at the load. A controller estimates a first voltage induced by the magnetic field based on the at least one measured current and measured voltage and the at least one operation parameter. The controller also estimates a second voltage based on the at least one operation parameter, the second voltage corresponding to a voltage at which the power receiver circuit operates with an efficiency level that exceeds a threshold efficiency. The communication circuit communicates the estimated voltages to the transmitter.

27 Claims, 7 Drawing Sheets

(51) Int. Cl.
    *H02J 50/80*     (2016.01)
    *H02J 50/10*     (2016.01)
    *H02J 7/02*      (2016.01)
    *H02J 5/00*      (2016.01)

(56) References Cited

U.S. PATENT DOCUMENTS

| | | |
|---|---|---|
| 2015/0077051 A1 | 3/2015 | Kim et al. |
| 2015/0303714 A1 | 10/2015 | Keeling et al. |
| 2016/0087476 A1 | 3/2016 | Carobolante |
| 2018/0034508 A1* | 2/2018 | Kim .................... H04B 5/0037 |

FOREIGN PATENT DOCUMENTS

| | | |
|---|---|---|
| WO | WO-2014112019 A1 | 7/2014 |
| WO | WO-2015144389 A1 | 10/2015 |

OTHER PUBLICATIONS

International Search Report and Written Opinion—PCT/US2017/045959—ISA/EPO—dated Oct. 23, 2017.

\* cited by examiner

METHODS AND APPARATUS FOR WIRELESS POWER AND COMMUNICATION TRANSFER

BACKGROUND

Field of the Invention

The present disclosure relates generally to wireless power transfer. More specifically, this disclosure relates to methods and apparatus for controlling wireless power transfer between power transfer units and power receiving units to provide high efficiency power transfer.

Description of the Related Art

In general, a power transfer unit (PTU) wirelessly transmits power to a wireless receiving unit (PRU) via a wireless field generated by the PTU. In order to help ensure that the PRU receives sufficient magnetic field strength while staying within its design constraints and voltage withstanding capability, the PTU may receive one or more communications from the PRU relating to a rectified voltage at the PRU. The rectified voltage may correspond to the induced voltage received wirelessly at the PRU from the PTU that is being transferred to a load of the PRU. Accordingly, to make the wireless power transfer most efficient, the PTU adjusts its transmit current based on the received rectified voltage. The transmit current may be adjusted to change the wireless field such that the received rectified voltage approaches a target voltage at the PRU. Thus, to obtain the highest efficiency possible in the power transfer (e.g., to approach the target voltage), the rectified voltage as received from the PRU at the PTU must be indicative of the induced voltage received by the PRU. However, as PRUs become more involved or sophisticated, the rectified voltage becomes less useful as an actual measure of the induced voltage that is received by the PRU. Accordingly, alternate parameters are needed from the involved or sophisticated PRU that accurately represent the induced voltage received by the PRU so the PTU can adjust its transmit current and the wireless field to maximize power transfer efficiencies and to stay within design/spec constraints. Thus, there is a need for methods and apparatus for identifying the induced voltage at the PRU and providing it to the PTU.

SUMMARY

Various implementations of methods and devices within the scope of the appended claims each have several aspects, no single one of which is solely responsible for the desirable attributes described herein. Without limiting the scope of the appended claims, some prominent features are described herein.

An aspect of this disclosure is an apparatus for receiving power wirelessly. The apparatus comprises a power receiver circuit, at least one receiver component, at least one sensor, a controller, and a communication circuit. The power receiver circuit is configured to receive power from a magnetic field generated by a power transmitter and provide power to a load. The at least one receiver component is operationally coupled with the power receiver circuit and operating based, at least in part, on at least one operation parameter. The at least one sensor is configured to measure at least one of a current and a voltage at the load. The controller is configured to estimate a first voltage induced by the magnetic field at the power receiver circuit based on the at least one measured current and measured voltage and the at least one operation parameter of the at least one receiver component. The controller is also configured to estimate a second voltage based on the at least one operation parameter of the at least one receiver component, the second voltage corresponding to a voltage at which the power receiver circuit operates with an efficiency level that exceeds a threshold efficiency. The communication circuit is configured to communicate the first voltage and the second voltage to the power transmitter.

Another aspect of this disclosure is a method for receiving power wirelessly at a power receive unit. The method comprises receiving power, via a power receive circuit, from a magnetic field generated by a power transmit unit. The method further comprises providing power to a load and measuring at least one of a current and a voltage at the load. The method also comprises estimating a first voltage induced by the magnetic field based on the at least one measured current and measured voltage and at least one operation parameter of at least one receiver component. The method further also comprises estimating a second voltage based on the at least one operation parameter of the at least one receiver component, the second voltage corresponding to a voltage at which the power receive circuit operates with an efficiency level that exceeds a threshold efficiency. The method also further comprises communicating the first voltage and the second voltage to the power transmit unit.

An additional aspect of this disclose is another apparatus for receiving power wirelessly. The apparatus comprises means for receiving power from a magnetic field generated by a power transmit unit and means for providing power to a load. The apparatus also comprises means for measuring at least one of a current and a voltage at the load. The apparatus further comprises means for estimating a first voltage induced by the magnetic field based on the at least one measured current and measured voltage and at least one operation parameter of at least one receiver component. The apparatus also further comprises means for estimating a second voltage based on the at least one operation parameter of the at least one receiver component, the second voltage corresponding to a voltage at which the means for receiving power operates with an efficiency level that exceeds a threshold efficiency. The apparatus further also comprises means for communicating the first voltage and the second voltage to the power transmit unit.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Figure 1:
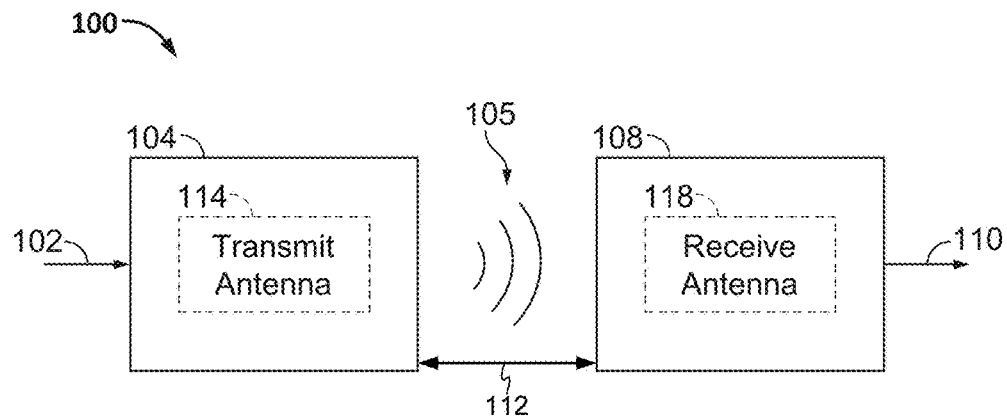
FIG. 1 is a functional block diagram of a wireless power transfer system, in accordance with one exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specified details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of a wireless power transfer system 100, in accordance with one exemplary implementation. Input power 102 may be provided to a transmitter 104 from a power source (not shown) to generate a wireless (e.g., magnetic or electromagnetic) field 105 for performing wireless power transfer. A receiver 108 may couple to the wireless field 105 and generate output power 110 for storage or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The wireless field 105 may also operate over a longer distance than is considered "near field." The transmitter 104 may include a transmit antenna 114 (e.g., a coil) for transmitting energy to the receiver 108. The receiver 108 may include a receive antenna or coil 118 for receiving or capturing energy transmitted from the transmitter 104. The near-field may correspond to a region in which there are strong reactance fields resulting from the currents and charges in the transmit antenna 114 that minimally radiate power away from the transmit antenna 114. The near-field may correspond to a region that is within about one wavelength (or a fraction thereof) of the transmit antenna 114.

Figure 2:
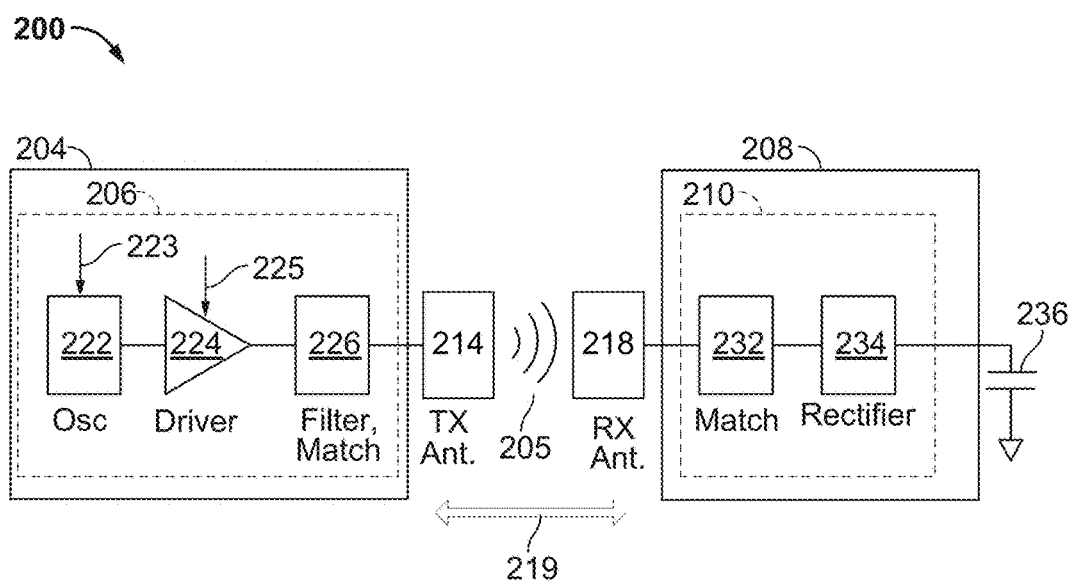
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired or target frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, ZigBee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
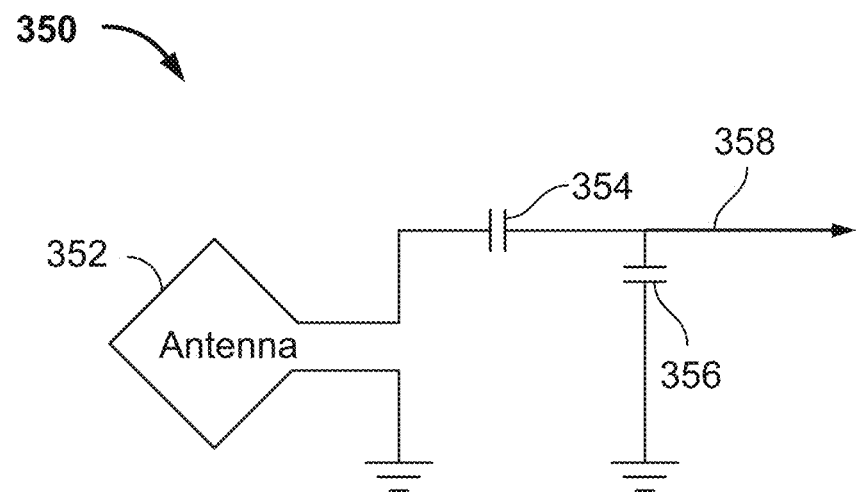
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown).

The transmit or receive circuitry 350 may form/include a resonant circuit. The resonant frequency of the loop or magnetic antennas is based on the inductance and capacitance. Inductance may be simply the inductance created by the antenna 352, whereas, capacitance may be added to the antenna's inductance to create a resonant structure at a desired or target resonant frequency. As a non-limiting example, a capacitor 354 and a capacitor 356 may be added to the transmit or receive circuitry 350 to create a resonant circuit. For a transmit circuitry, a signal 358 may be an input at a resonant frequency to cause the antenna 352 to generate a wireless field 105/205. For receive circuitry, the signal 358 may be an output to power or charge a load (not shown). For example, the load may comprise a wireless device configured to be charged by power received from the wireless field.

Other resonant circuits formed using other components are also possible. As another non-limiting example, a capacitor may be placed in parallel between the two terminals of the circuitry 350.

Referring to FIGS. 1 and 2, the transmitter 104/204 may output a time varying magnetic (or electromagnetic) field with a frequency corresponding to the resonant frequency of the transmit antenna 114/214. When the receiver 108/208 is within the wireless field 105/205, the time varying magnetic (or electromagnetic) field may induce a current in the receive antenna 118/218. As described above, if the receive antenna 118/218 is configured to resonate at the frequency of the transmit antenna 114/214, energy may be efficiently transferred. The AC signal induced in the receive antenna 118/218 may be rectified as described above to produce a DC signal that may be provided to charge or to power a load.

Figure 4:
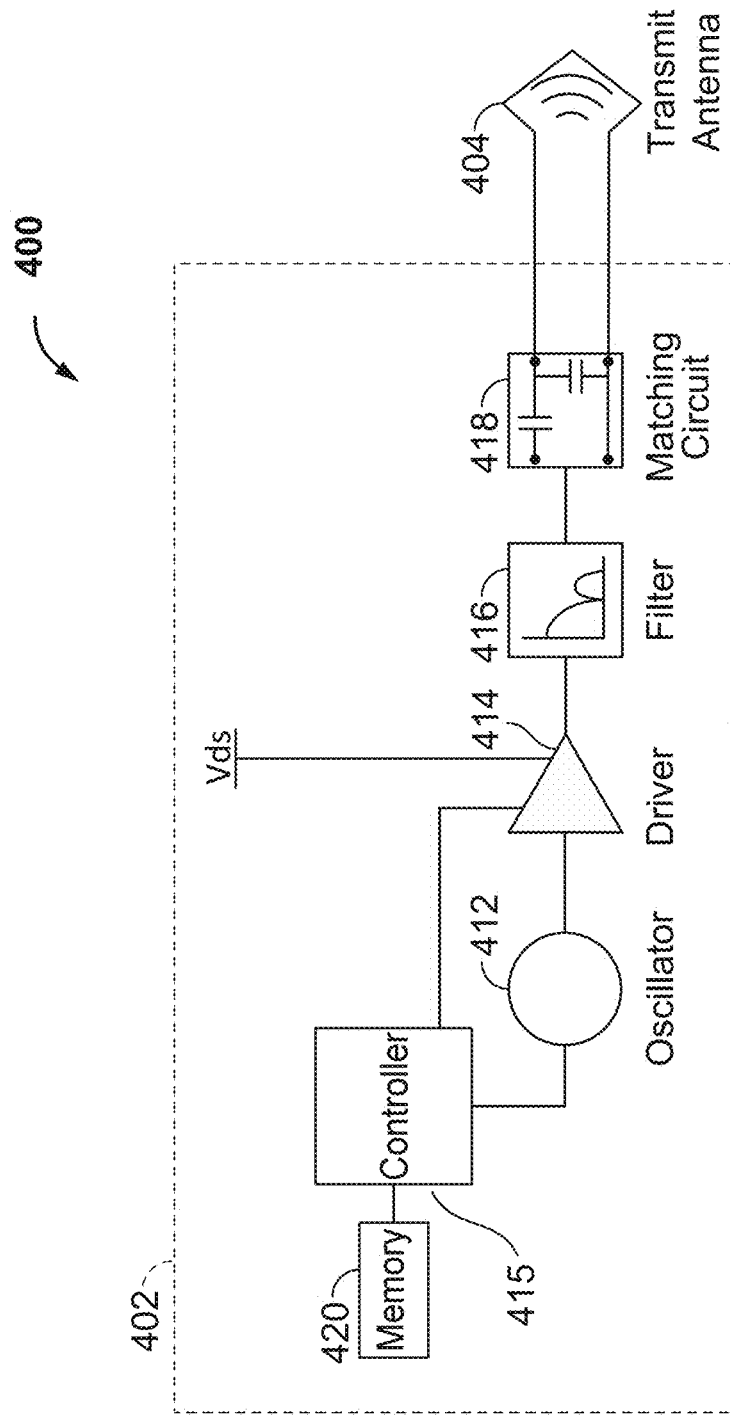
FIG. 4 is a simplified functional block diagram of a transmitter that may be used in an inductive power transfer system, in accordance with exemplary implementations of the invention.

FIG. 4 is a simplified functional block diagram of a transmitter that may be used in an inductive power transfer system, in accordance with exemplary implementations of the invention. As shown in FIG. 4, the transmitter 400 includes transmit circuitry 402 and a transmit antenna 404 operably coupled to the transmit circuitry 402. The transmit antenna 404 may be configured as the transmit antenna 214 as described above in reference to FIG. 2. In some implementations, the transmit antenna 404 may be a coil (e.g., an induction coil). In some implementations, the transmit antenna 404 may be associated with a larger structure, such as a table, mat, lamp, or other stationary configuration. The transmit antenna 404 may be configured to generate an electromagnetic or magnetic field. In an exemplary implementation, the transmit antenna 404 may be configured to transmit power to a receiver device within a charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices as described herein. As such, the transmitter 400 may provide wireless power efficiently and safely.

The transmit circuitry 402 may further include a controller 415. In some implementations, the controller 415 may be a micro-controller. In other implementations, the controller 415 may be implemented as an application-specified integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 may further include a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 may further include an oscillator 412 operably connected to the controller 415. The oscillator 412 may be configured as the oscillator 222 as described above in reference to FIG. 2. The oscillator 412 may be configured to generate an oscillating signal (e.g., radio frequency (RF) signal) at the operating frequency of the wireless power transfer. In some exemplary implementations, the oscillator 412 may be configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of power to the transmit antenna 404, which may generate energy (e.g., magnetic flux) about the transmit antenna 404.

The transmit circuitry 402 may further include a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 may further include a low pass filter (LPF) 416 operably connected to the transmit antenna 404. The low pass filter 416 may be configured as the filter portion of the filter and matching circuit 226 as described above in reference to FIG. 2. In some exemplary implementations, the low pass filter 416 may be configured to receive and filter an analog signal of current and an analog signal of voltage generated by the driver circuit 414. The analog signal of current may comprise a time-varying current signal, while the analog signal of current may comprise a time-varying voltage signal. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specified frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 (e.g., 50 ohms) to the transmit antenna 404. Other exemplary implementations may include an adaptive impedance match that may be varied based on measurable transmit metrics, such as the measured output power to the transmit antenna 404 or a DC current of the driver circuit 414. The transmit circuitry 402 may further comprise discrete devices, discrete circuits, and/or an integrated assembly of components.

Transmit antenna 404 may be implemented as an antenna strip with the thickness, width and metal type selected to keep resistance losses low.

Figure 5:
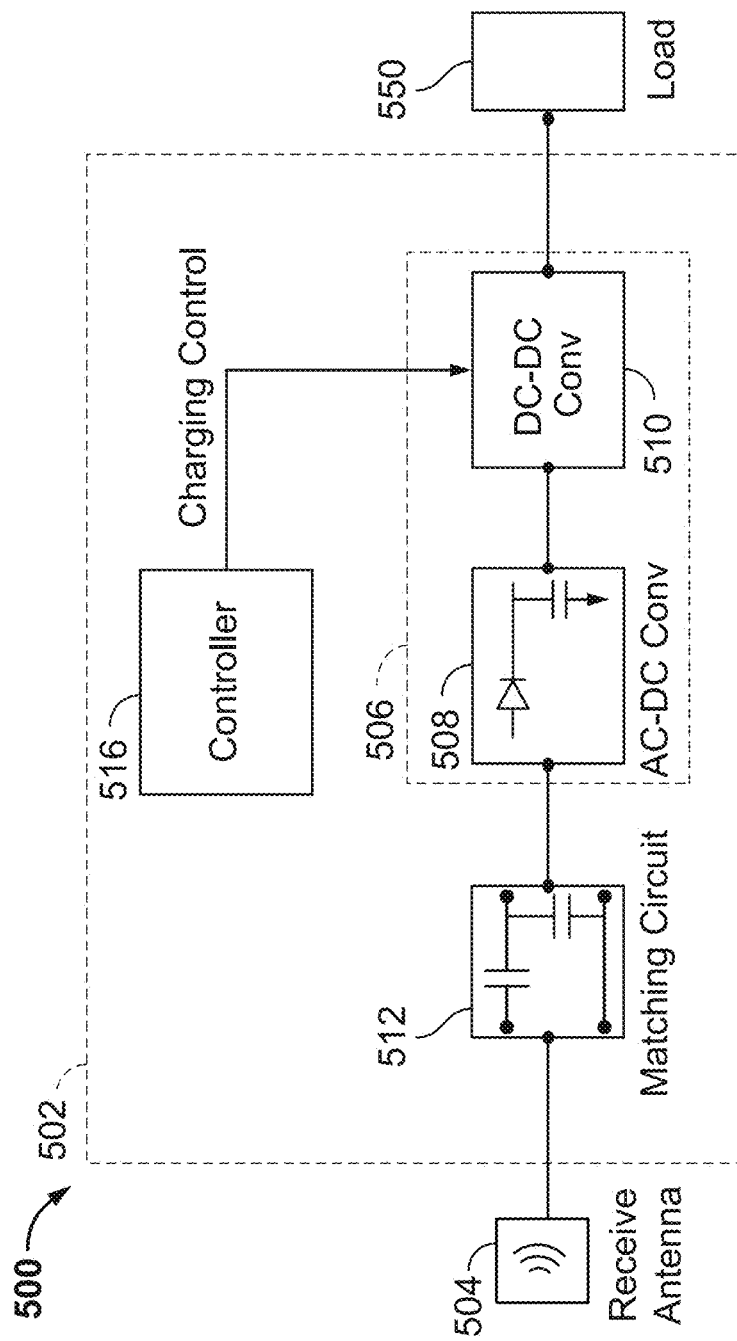
FIG. 5 is a simplified functional block diagram of a receiver that may be used in the inductive power transfer system, in accordance with exemplary implementations of the invention.

FIG. 5 is a block diagram of a receiver, in accordance with an implementation of the present invention. As shown in FIG. 5, a receiver 500 includes a receive circuitry 502, a receive antenna 504, and a load 550. The receiver 500 further couples to the load 550 for providing received power thereto. Receiver 500 is illustrated as being external to device acting as the load 550 but may be integrated into load 550. The receive antenna 504 may be operably connected to the receive circuitry 502. The receive antenna 504 may be configured as the receive antenna 218 as described above in reference to FIG. 2. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to the magnetic field generated by the transmit antenna 404, as described above, and provide an amount of received energy to the receive circuitry 502 to power or charge the load 550.

The receive circuitry 502 may be operably coupled to the receive antenna 504 and the load 550. The receive circuitry may be configured as the receive circuitry 210 as described above in reference to FIG. 2. The receive circuitry 502 may be configured to match an impedance of the receive antenna 504, which may provide efficient reception of wireless power. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 may include a processor-signaling controller 516 configured to coordinate the processes of the receiver 500 described below.

The receive circuitry 502 provides an impedance match to the receive antenna 504. The receive circuitry 502 includes power conversion circuitry 506 for converting a received energy into charging power for use by the load 550. The power conversion circuitry 506 includes an AC-to-DC converter 508 coupled to a DC-to-DC converter 510. The AC-to-DC converter 508 rectifies the AC energy signal received at the receive antenna 504 into a non-alternating power while the DC-to-DC converter 510 converts the rectified AC energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include a matching circuit 512. The matching circuit 512 may comprise one or more resonant capacitors in either a shunt or a series configuration. In some implementations these resonant capacitors may tune the receive antenna to a specific frequency or to a specific frequency range (e.g., a resonant frequency).

The load 550 may be operably connected to the receive circuitry 502. The load 550 may be configured as the battery 236 as described above in reference to FIG. 2. In some implementations the load 550 may be external to the receive circuitry 502. In other implementations the load 550 may be integrated into the receive circuitry 502.

In wireless transfer systems, the wireless transfer of power between a power transfer unit (PTU) 400 (e.g., the transmitter 400 of FIG. 4) and a power receive unit (PRU) 500 (e.g., the receiver 500 of FIG. 5) is directly controlled by a transmit current that feeds the PTU's antenna (e.g., antenna 404). Based on the transmit current of the PTU 400, a magnetic field having a magnetic field strength is generated by the PTU's antenna 404. This magnetic field strength determines, at least in part, the voltage induced at the PRU 500. In some implementations, for example implementations involving unsophisticated PRUs 500, the estimated voltage induced at the PRU 500 corresponds to a measured rectified voltage ($V_{rect}$). Accordingly, the measured $V_{rect}$ may be communicated to the PTU 400 to allow the PTU 400 to control its transmit current to adjust the $V_{rect}$ to a desired or target voltage. In some implementations, the target voltage will maximize power transfer efficiency. The target voltage may be a desired voltage, a threshold voltage, a user set voltage, and/or an optimal voltage. Based on the reporting of the $V_{rect}$ from the PRU 500 to the PTU 400 and the PTU's adjustment of its transmit current based on the reported $V_{rect}$, ideal operating points between the two devices (and/or between the PTU and multiple PRUs) can be tracked and maintained over time.

However, in implementations where the PRU 500 is involved or sophisticated, the $V_{rect}$ may not be an accurate measure of the most efficient or target voltage. For example, in some implementations, the involved or sophisticated PRU 500 comprises a dynamically adjustable rectifier circuit that includes various components (e.g., a voltage doubler, a full-bridge rectifier, one or more tuning capacitors or inductors, etc.) that change the $V_{rect}$. Accordingly, the $V_{rect}$ alone may not necessarily be indicative of or directly associated with the voltage induced by the magnetic field at the PRU 500. For example, based on added components and complexity of the PRU 500, the $V_{rect}$ as measured and reported by the PRU 500 may be constant over a range of magnetic fields, even if the PRU 500 is not operating at an efficient level or within its designed operating voltage range. Accordingly, the reporting of the $V_{rect}$ from the PRU 500 to the PTU 400 and the PTU's adjustment of its transmit current based on the reported $V_{rect}$ may no longer ensure that power transfer at ideal operating points between the two devices can be tracked and maintained over time.

Alternatively, in some implementations, it is desirable to measure or determine additional and/or different values by the PRU 500 and report them to the PTU 400. In some implementations, the PRU 500 reports these additional and/or different values directly to the PTU 400 to determine the ideal transmit current. For example, the PRU 500 communicates an induced voltage and/or a target induced voltage to the PTU 400 via a communication channel (e.g., Bluetooth, inband signaling, etc.). In some implementations, the PRU 500 "translates or associates these additional and/or different values with different $V_{rect}$ values for reporting to the PTU 400. For example, the PRU 500 associates a determined induced voltage or target induced voltage with a $V_{rect}$ that the PRU 500 knows will cause the PTU 400 to adjust its transmit current to a specific level and cause a known change to the induced voltage at the PRU 500. The PRU 500 may also convert the estimated induced voltage and the estimated target induced voltage to a $V_{rect}$ value (or another format understood by PTUs 400). By being able to convert the determined induced voltage or target induced voltage to a $V_{rect}$, the PRU 500 may maintain interoperability with PTUs 400 configured to receive $V_{rect}$ values for optimizing power transfer efficiencies. In some implementations, the induced voltage may correspond to an open circuit voltage as seen by the receive antenna 504 of the PRU 500

Thus, in implementations of PRUs 500 without dynamic tuning or voltage modifying components, the measured $V_{rect}$ is a function of the induced voltage EMF and can be used to regulate the PTU's transmit current, as described above. In implementations of PRUs 500 having dynamic tuning and/or a controlled synchronous rectifier, the $V_{rect}$ alone is not sufficient to regulate the induced voltage EMF.

Figure 6:
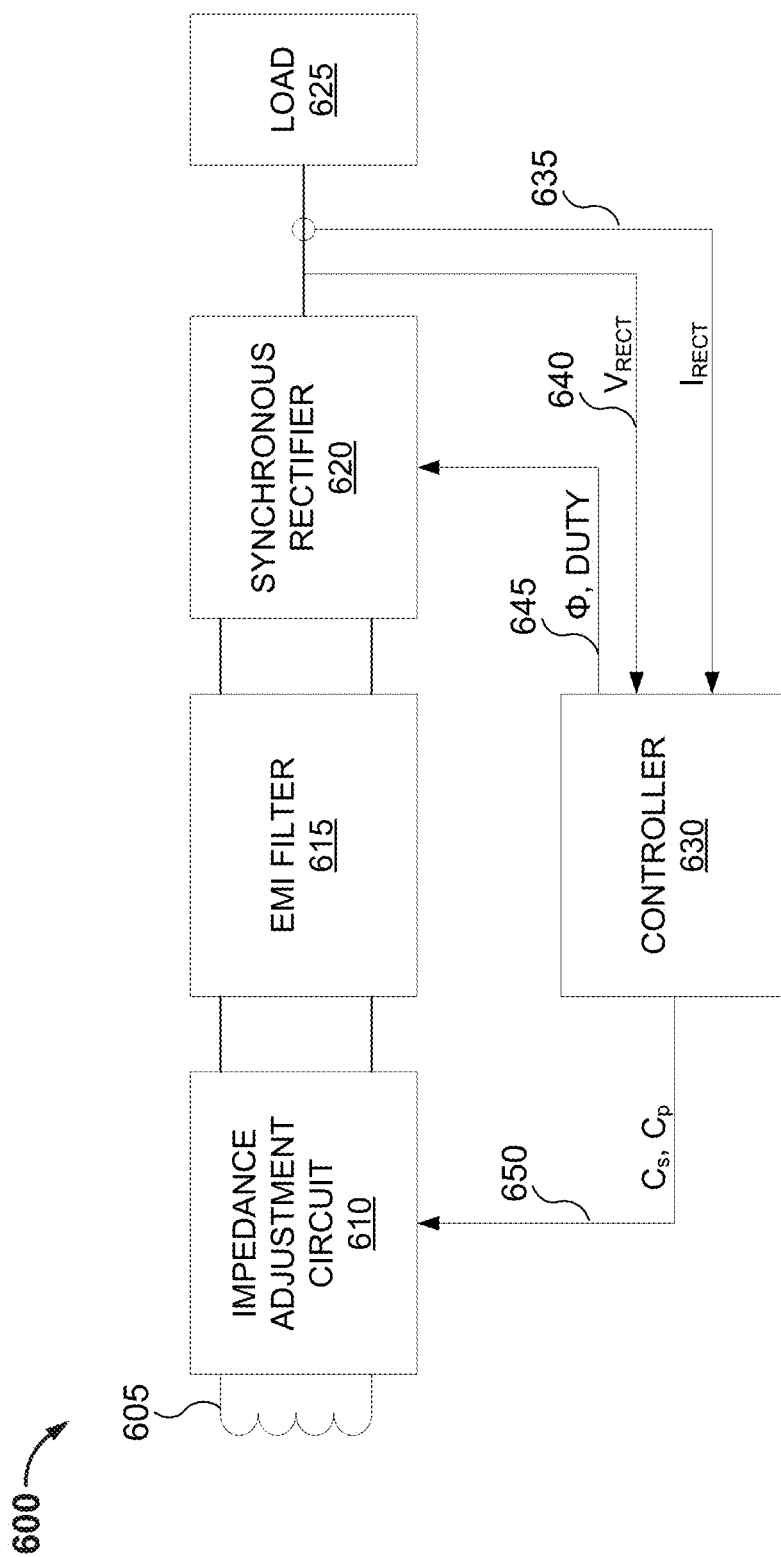
FIG. 6 is a simplified functional block diagram of a receiver configured to identify an induced voltage and a target induced voltage that may be used to improve wireless power transfer efficiencies in the inductive power transfer system, in accordance with exemplary implementations of the invention.

FIG. 6 is a simplified functional block diagram of a receiver (PRU) 600 configured to identify an induced voltage and a target induced voltage (e.g., operation parameters) that may be used to improve wireless power transfer efficiencies and ensure standards compliance in the inductive power transfer system, in accordance with exemplary implementations of the invention. The PRU 600 may be configured to identify and/or estimate an induced voltage at the PRU 600 that corresponds to the magnetic field generated by the PTU (not shown in this figure). The PRU 600 comprises an antenna 605, an impedance adjustment circuit 610, an electromagnetic interference ("EMI") filter 615, a synchronous rectifier 620, a load 625, and a controller 630. Additionally, the PRU 600 may include an $I_{rect}$ signal 635 (between the controller 630 and an input of the load 625 or output of the synchronous rectifier 620) and a $V_{rect}$ signal 640 (also between the controller 630 and the input of the load 625 or output of the synchronous rectifier 620). The PRU 000 also includes a phase (Φ) and duty signal 645 between the controller 630 and the synchronous rectifier and a series and shunt capacitance signal 650 between the controller and the impedance adjustment circuit 610. In some implementations, the $I_{rect}$ and $V_{rect}$ measurements may be performed by one or more sensors or other components configured to measure current and/or voltage at various locations in the PRU 600.

The antenna 605 of the PRU 600 may wirelessly receive power via the magnetic field (not shown in this figure). The magnetic field may generate an induced voltage in the antenna 605 when it is exposed to the magnetic field. The antenna 605 is coupled to the impedance adjustment circuit 610 such that the induced voltage is an input of the impedance adjustment circuit 610. The impedance adjustment circuit 610 may dynamically adjust an impedance, Z, of the PRU 600 as seen by the PTU (for example, by adjusting one or both of a reactance component, X, and a resistance component, R, of the impedance, Z, of the PRU 600). In some implementations, the voltage at the output of the impedance adjustment circuit 610 is or is not directly associated with the transmit current of the PTU and the generated magnetic field strength. In some implementations, the controller 630 provides one or more inputs to the impedance adjustment circuit 610, according to which the impedance adjustment circuit 610 may adjust the impedance, Z, of the PRU 600.

The impedance adjustment circuit 610 may be further coupled to the EMI filter 615. The EMI filter 615 may be configured to suppress and/or reduce interference. The EMI filter 615 may generate a filtered voltage that is output to the synchronous rectifier 620 coupled to the EMI filter 615. The synchronous rectifier 620 may be configured to rectify the filtered voltage received from the EMI filter 615. The synchronous rectifier 620 may be more efficient than passive rectifiers. In some implementations, the synchronous rectifier 620 receives one or more inputs from the controller 630. In some implementations, the controller 630 provides one or more inputs to the synchronous rectifier 620, according to which the synchronous rectifier 620 may adjust a rectification of the PRU 600. While controlling the synchronous rectifier 620 may not impact induced voltage, adjusting the synchronous rectifier 620 may directly impact an output voltage of the synchronous rectifier 620 (e.g., $V_{rect}$) and may impact an effective impedance of the synchronous rectifier 620. The effective impedance of the synchronous rectifier 620 may impact the impedance of the PRU 600 as well as an efficiency of the PRU 600. Accordingly, the synchronous rectifier 620 can be used as a dynamic tuning element to keep $V_{rect}$ within a certain range, improve system efficiency, etc. The output of the synchronous rectifier 620 is directed to the load 625. In some implementations, the output of the synchronous rectifier 620 is a voltage for charging and or powering the load 625. The load 625, in some implementations, comprises a battery or other energy storage device or a component that is powered by the rectified voltage received from the synchronous rectifier 620.

In some implementations, the impedance adjustment circuit 610 and/or the synchronous rectifier 620 may be referred to as receiver components. Receiver components may comprise any component(s) that varies or modulates the induced voltage to generate the rectified DC voltage provided to the load 625. For example, the receiver components may include individual capacitors or inductors or circuits comprising multiple individual components. In some implementations, the receiver component(s) are characterized by one or more characteristics or parameters that affect or control performance of the receiver component(s) (e.g., set points or control variables, etc.). For example, when the receiver component is a capacitor, the receiver component may be characterized by a capacitance value. Similarly, when the receive component is the impedance adjustment circuit 610 or the synchronous rectifier 620, the receiver component may be characterized by capacitance or phase and duty values, respectively. These parameters may be controlled by the controller 630 and/or may be used in calculations (e.g., as inputs) as described below.

The controller 630 may be configured to control one or more components of the PRU 600 and perform one or more voltage determination or identifications at the PRU 600. In some implementations, the controller 630 receives one or more "inputs" from one or more components or points of the PRU 600. The inputs may receive values or measurements received from other components of the PRU 600 (e.g., the receiver components) and may receive set points and/or control variables established by the controller 630. For example, the one or more values or measurements comprise voltage and current measurements (e.g., $V_{rect}$ and $I_{rect}$ measurements). In some implementations, the controller 630 may measure or receive the measurements of the $I_{rect}$ and $V_{rect}$ via the signals 635 and 640, respectively. In some implementations, the $I_{rect}$ and $V_{rect}$ measurements may be performed by one or more sensors or other components configured to measure current and/or voltage at various locations in the PRU 600, where the signals 635 and 640 are received by the controller 630 from the one or more sensors. The set points and/or system control variables (e.g., phase and duty cycle of rectifier controlled rectifiers and tuning variables of series and/or shunt tuning capacitors) may be set points and system control variables that are controlled by the controller 630 itself and set via the signal 645 to the synchronous rectifier 620 and signal 650 to the impedance adjustment circuit 610.

Based on these inputs, the controller 630 may estimate an induced voltage (or electromotive force $EMF_{FB}$), which may correspond to the induced voltage of the PRU. In some implementations, the $EMF_{FB}$ may be determined using Equation 1:

$$EMF_{FB} = w * M * I_{tx} \quad \text{(Equation 1)}$$

where:
 w=frequency, in hertz (Hz);
 M=mutual inductance, in henry (H); and
 $I_{tx}$=the transmit current at the PTU, in amps (A).
In some implementations, the induced voltage $EMF_{FB}$ is based, at least in part, on a location of the PRU 600 in the generated magnetic field (e.g., a position or location of the PRU 600 on a charging surface of the PTU) and the transmit current of the PTU. In some implementations, the $EMF_{FB}$ as determined by the PRU 600 is scaled as needed and, thus, replaces $V_{rect}$ when used with existing PTU control mechanisms.

In some implementations, the controller 630 comprises at least one estimator that is used to estimate the induced voltage $EMF_{FB}$ based on the identified inputs. In some implementations, the estimator uses one or more estimation models to predict the induced voltage $EMF_{FB}$ based on the inputs. A non-exhaustive list of exemplary estimation models is provided below.

A first estimator of the controller 630 may comprise a multi-variable curve fit estimator model based on simulation data or hardware prototype measurements. The curve fit model may generate an equation that is based on particular hardware or a component of the PRU 600. For example, the multi-variable curve fit estimator model may be based on a simulation of a dynamically tuned PRU 600 (e g, a dynamically tuned impedance adjustment circuit 610 or a controlled synchronous rectifier 620). For example, Equation 2 below is an example of a curve fit model for a dynamically tuned PRU 600:

$$EMF_{FB} = 2.93436 + 0.010181 * C_p + 0.200956 * V_{rect} + 0.672261 * I_{rect} \quad \text{(Equation 2)}$$

where:
 $C_p$=a shunt dynamic capacitance of the impedance adjustment circuit 610, Pico farads (pF);

$V_{rect}$ rectified voltage at the output of the synchronous rectifier 620 transferred to the load 625, in volts (V); and $I_{rect}$=current at the output of the synchronous rectifier 620, in amps (A)

Simulation data used to generate the curve fit model of Equation 2 is shown in Table 1 below. In some embodiments, other methods may be used to generate the curve fit model of Equation 2, such as a dynamically operated simulation, measurements from a prototype, etc. Accordingly, contrary estimated the induced voltage of the PRU purely by measuring the $V_{rect}$ as discussed above in relation to unsophisticated PRUs, the controller 630 estimates the induced voltage of the PRU by including various parameters of the receiver components. For example, for the PRU 600 shown in FIG. 6, the controller 630 may utilize parameters from the impedance adjustment circuit 610 and the synchronous rectifier 620 along with the measured $V_{rect}$ and $I_{rect}$ to estimate the induced voltage at the PRU 600. Thus, the estimated induced voltage for the sophisticated PRU 600 is more accurate due to the inclusion of a larger number of variables in the estimation equation.

TABLE 1

Data to Generate Equation 2

| Cp | Vrect | Irect | Actual EMF | Predicted EMF (EMFFB) |
|---|---|---|---|---|
| 183.33 | 3.00 | 2.50 | 6.95 | 7.09 |
| 183.33 | 3.50 | 2.34 | 6.95 | 7.07 |
| 183.33 | 4.00 | 2.16 | 6.95 | 7.06 |
| 195.67 | 3.00 | 3.13 | 6.95 | 7.64 |
| 195.67 | 3.50 | 2.91 | 6.95 | 7.59 |
| 195.67 | 4.00 | 2.69 | 6.95 | 7.54 |
| 208.00 | 3.00 | 3.35 | 6.95 | 7.90 |
| 208.00 | 3.50 | 3.13 | 6.95 | 7.86 |
| 208.00 | 4.00 | 2.91 | 6.95 | 7.81 |
| 220.33 | 3.00 | 2.90 | 6.95 | 7.73 |
| 220.33 | 3.50 | 2.75 | 6.95 | 7.73 |
| 220.33 | 4.00 | 2.60 | 6.95 | 7.73 |
| 232.67 | 3.00 | 2.32 | 6.95 | 7.47 |
| 232.67 | 3.50 | 2.24 | 6.95 | 7.51 |
| 232.67 | 4.00 | 2.15 | 6.95 | 7.55 |
| 245.00 | 3.00 | 1.88 | 6.95 | 7.29 |
| 245.00 | 3.50 | 1.82 | 6.95 | 7.36 |
| 245.00 | 4.00 | 1.77 | 6.95 | 7.42 |
| 183.33 | 3.00 | 2.30 | 7.53 | 7.28 |
| 183.33 | 3.50 | 2.63 | 7.53 | 7.27 |
| 183.33 | 4.00 | 2.46 | 7.53 | 7.26 |
| 195.67 | 3.00 | 3.51 | 7.53 | 7.89 |
| 195.67 | 3.50 | 3.29 | 7.53 | 7.84 |
| 195.67 | 4.00 | 3.07 | 7.53 | 7.79 |
| 208.00 | 3.00 | 3.74 | 7.53 | 8.17 |
| 208.00 | 3.50 | 3.52 | 7.53 | 8.12 |
| 208.00 | 4.00 | 3.30 | 7.53 | 8.07 |
| 220.33 | 3.00 | 3.21 | 7.53 | 7.94 |
| 220.33 | 3.50 | 3.07 | 7.53 | 7.94 |
| 220.33 | 4.00 | 2.92 | 7.53 | 7.94 |
| 232.67 | 3.00 | 2.56 | 7.53 | 7.63 |
| 232.67 | 3.50 | 2.47 | 7.53 | 7.67 |
| 232.67 | 4.00 | 2.39 | 7.53 | 7.71 |
| 245.00 | 3.00 | 2.06 | 7.53 | 7.42 |
| 245.00 | 3.50 | 2.01 | 7.53 | 7.48 |
| 245.00 | 4.00 | 1.95 | 7.53 | 7.54 |
| 183.33 | 3.00 | 3.09 | 8.11 | 7.48 |
| 183.33 | 3.50 | 2.92 | 8.11 | 7.47 |
| 183.33 | 4.00 | 2.76 | 8.11 | 7.46 |

Equation 3 below is an example of a curve fit model for a PRU 600 utilizing a controlled synchronous rectifier:

$$EMF_{FB} = -0.233096 + 0.113718 * \text{Phase} + 0.798436 * V_{rect} + 9.17238 * I_{rect} \quad \text{(Equation 3)}$$

where:
Phase=a phase difference between an AC input waveform at the synchronous rectifier 620 and a firing angle for the switches of the synchronous rectifier 620 (for example, an ideal rectifier may operate with zero phase, where the phase can be adjusted to achieve other goals);

$V_{rect}$=rectified voltage at the output of the synchronous rectifier 620 transferred to the load 625; and $I_{rect}$=current at the output of the synchronous rectifier 620

Simulation data used to generate the curve fit model of Equation 3 is shown in Table 2 below. In some embodiments, other methods may be used to generate the curve fit model of Equation 3, such as a dynamically operated simulation, measurements from a prototype, etc.

TABLE 2

Data to Generate Equation 3

| Phase | Vrect | Irect | Actual EMF | Predicted EMF (EMFFB) |
|---|---|---|---|---|
| 12.50 | 3.00 | 0.37 | 6.95 | 7.52 |
| 12.50 | 3.50 | 0.33 | 6.95 | 7.52 |
| 12.50 | 4.00 | 0.29 | 6.95 | 7.54 |
| 10.00 | 3.00 | 0.41 | 6.95 | 7.61 |
| 10.00 | 3.50 | 0.37 | 6.95 | 7.61 |
| 10.00 | 4.00 | 0.32 | 6.95 | 7.59 |
| 7.50 | 3.00 | 0.45 | 6.95 | 7.68 |
| 7.50 | 3.50 | 0.41 | 6.95 | 7.68 |
| 7.50 | 4.00 | 0.36 | 6.95 | 7.64 |
| 5.00 | 3.00 | 0.49 | 6.95 | 7.70 |
| 5.00 | 3.50 | 0.44 | 6.95 | 7.68 |
| 5.00 | 4.00 | 0.39 | 6.95 | 7.64 |
| 2.50 | 3.00 | 0.50 | 6.95 | 7.55 |
| 2.50 | 3.50 | 0.45 | 6.95 | 7.53 |
| 2.50 | 4.00 | 0.40 | 6.95 | 7.47 |
| 0.00 | 3.00 | 0.51 | 6.95 | 7.36 |
| 0.00 | 3.50 | 0.46 | 6.95 | 7.33 |
| 0.00 | 4.00 | 0.41 | 6.95 | 7.27 |
| 12.50 | 3.00 | 0.42 | 7.53 | 7.99 |
| 12.50 | 3.50 | 0.39 | 7.53 | 8.03 |
| 12.50 | 4.00 | 0.34 | 7.53 | 8.01 |
| 10.00 | 3.00 | 0.47 | 7.53 | 8.13 |
| 10.00 | 3.50 | 0.43 | 7.53 | 8.15 |
| 10.00 | 4.00 | 0.38 | 7.53 | 8.13 |
| 7.50 | 3.00 | 0.51 | 7.53 | 8.24 |
| 7.50 | 3.50 | 0.47 | 7.53 | 8.25 |
| 7.50 | 4.00 | 0.43 | 7.53 | 8.24 |
| 5.00 | 3.00 | 0.55 | 7.53 | 8.27 |
| 5.00 | 3.50 | 0.50 | 7.53 | 8.27 |
| 5.00 | 4.00 | 0.46 | 7.53 | 8.25 |
| 2.50 | 3.00 | 0.56 | 7.53 | 8.13 |
| 2.50 | 3.50 | 0.52 | 7.53 | 8.13 |
| 2.50 | 4.00 | 0.47 | 7.53 | 8.10 |
| 0.00 | 3.00 | 0.57 | 7.53 | 7.95 |
| 0.00 | 3.50 | 0.53 | 7.53 | 7.94 |
| 0.00 | 4.00 | 0.48 | 7.53 | 7.90 |
| 12.50 | 3.00 | 0.47 | 8.11 | 8.44 |
| 12.50 | 3.50 | 0.44 | 8.11 | 8.50 |
| 12.50 | 4.00 | 0.39 | 8.11 | 8.51 |

Thus, a curve fit model equation may be developed for any configuration of the PRU 600. In some implementations, more complicated polynomials may be used to implement the curve fit model as required—the polynomial will model the physical relationships.

The curve fit estimator model may be advantageous as an estimator because it is agnostic to specific system states and/or modes of the PRU 600. For example, the curve fit estimator may be capable of predicting induced voltages $EMF_{FB}$ over an entire range of PRU system states (e.g., voltages, currents, dynamic capacitances, etc.). Additionally, the curve fit estimator model may be configured to include load power compensation, thereby accounting for voltage drops, impacts on tunings due to load changes, etc. Furthermore, overvoltage conditions can be better defined using the curve fit estimator models and estimated induced voltage ($EMF_{FB}$) and a state of the system control variables (e.g., maximum de-tuning). Adjusting the $I_{fx}$ based on the $V_{rect}$ as compared to the $EMF_{FB}$ and $EMF_{SET}$ adjustment as described herein, is load dependent (e.g., dependent on a battery, or other load of the PRU 600). The $V_{rect}$ being load dependent means that the reported $V_{rect}$ can fluctuate based on an amount of power delivered by the PRU 600 to its load. The $EMF_{FB}$ method may address this by providing an estimated induced $EMF_{FB}$ based on one or more variables that reflect a current state of the PRU 600, which may impact the induced $EMF_{FB}$. The curve fit estimator model may also allow for a reduction of memory otherwise used for storage of interpolated data.

More generally, one example of a broader covering equation may be seen in Equation 4 below. Equation 4 shows that the estimated induced voltage may be a sum of rectified voltages, rectified currents, variable reactance and/or impedance values, and rectifier phase control values. For example, where the PRU 600 comprises both the dynamically tuned impedance adjustment circuits 610 and the controlled synchronous rectifier 620, estimated induced voltage may comprise load DC voltage and current, reactance of the impedance adjustment circuit 610 and phase of the controlled synchronous rectifier 620. For example, the estimated induced voltage be a sum of $V_{rect}$, $I_{rect}$, reactance, phase and duty (not shown) components of the PRU implementation. Generic equation $$EMF_{FB}=[i_0 V_{rect}+i_1 V_{rect}^2+\ldots i_n V_{rect}^n]+[j_0 I_{rect}+j_1 I_{rect}^2+\ldots j_n I_{rect}^n]+[k_0 X+k_1 X^2+\ldots k_n X^n]+[l_0 \text{Phase}+l_1 \text{Phase}^2+\ldots l_n \text{Phase}^n]+A \quad \text{(Equation 4)}$$

where $i_n$, $j_n$, $k_n$, $l_n$, A are constants

X corresponds to a variable reactance element

Equation 4 may be used to generally determine the estimated induced voltage for any PRU 600. However, other similar equations including other variables corresponding to a different PRU implementation may be used to generate an estimate of the induced voltage for the PRU 600.

In some implementations, the first estimator of the controller 630 uses a look-up table estimator model. This estimator model may comprise one or more look-up tables that are generated based on simulation data or hardware prototype measurements. Accordingly, the second estimator may select the induced voltage $EMF_{FB}$ from the look-up table(s) based on the $V_{rect}$, $I_{rect}$, and control variable inputs described herein, which may correspond to a single entry for the induced voltage $EMF_{FB}$. Such an implementation may utilize reduced computational power as compared to the curve fit estimator model. In some implementations, the first estimator of the controller 630 uses an analytical estimator model that is based on a description of the PRU 600. Such an estimator model may utilize an analytical model of a component of the PRU 600 (e.g., the synchronous rectifier 620) and a simplified equivalent model for the remaining portions of the PRU 600 (e.g., a Thevenin equivalent model for the front end of the PRU 600 when the analytical model is the synchronous rectifier 620). Accordingly, the analytical model may comprise a physical model or a model comprising functionally equivalent equations corresponding to the components of the PRU 600. For example, the Thevenin equivalent model may correspond to one or more components of the PRU 600 in the analytical model. This is different from the curve fit estimator described herein, which may comprise a mathematical model based on simulated or measured data as opposed to equivalents.

Once (or while) the PRU 600 identifies or determines the estimated induced voltage $EMF_{FB}$, the controller 630 of the PRU 600 (e.g., via the controller 630) may estimate and/or predict a target induced voltage $EMF_{SET}$ at which the power transfer between the PTU and the PRU 600 will be at optimal efficiency. In some implementations, the controller 630 comprises a second estimator that is used to estimate the target induced voltage $EMF_{SET}$ at the PRU 600. The target induced voltage may correspond to a particular PRU 600 system state. For example, the particular system state comprises a particular position within the magnetic field or on the charging surface of the PTU 605. In some implementations, the particular system state comprises one or more components of the PRU 600 (e.g., the current set points of the dynamically tunable impedance adjustment circuit 610 or the controlled synchronous rectifier 620.

In some implementations, the second estimator that is used to estimate the target induced voltage $EMF_{SET}$ comprises one or more estimation models to determine the target induced voltage $EMF_{SET}$ based on inputs that tell the second estimator the system state(s) of the PRU 600. A non-exhaustive list of exemplary estimation models for the second estimator is provided below.

The second estimator of the controller 630 may comprise a multi-variable curve fit estimator model based on simulation data or hardware prototype measurements. The curve fit model may generate an equation that is based on particular hardware or a component of the PRU 600 (e.g., a unique curve fit model may be generated for each "system state" of the PRU 600). For example, the multi-variable curve fit estimator model may be based on a simulation of a dynamically tuned PRU 600 (e.g., a dynamically tuned impedance adjustment circuit 610 or a controlled synchronous rectifier 620) having particular tuning characteristics or set point(s). In some implementations, the multi-variable curve fit estimator model includes efficiency information and/or data in its calculations.

In some implementations, the second estimator of the controller 630 uses a look-up table estimator model. This estimator model may comprise a look-up table that is generated based on simulation data or hardware prototype measurements. Accordingly, the second estimator may select the target induced voltage $EMF_{SET}$ from the look-up table based on the $V_{rect}$, $I_{rect}$, efficiency information, and control variable inputs described herein, which may correspond to a single entry for the induced voltage $EMF_{SET}$. Such an implementation may utilize reduced computational power as compared to the curve fit estimator model. In some implementations, the second estimator of the controller 630 uses an analytical estimator model that is based on a description of the PRU 600. Such an estimator model may utilize an analytical model of a component of the PRU 600 (e.g., the synchronous rectifier 620) and a simplified equivalent model for the remaining portions of the PRU 600 (e.g., a Thevenin equivalent model for the front end of the PRU 600 when the analytical model is the synchronous rectifier 620).

In some implementations, the second estimator of the controller 630 uses a rule based approach to determine the target induced voltage $EMF_{SET}$. Accordingly, the second estimator of the controller 630 may implement the rule based approach whereby a goal (e.g., a desired value) is achieved at the PRU 600 by adjusting or changing an associated variable, eliciting a corresponding adjustment or change at the PTU 605. Accordingly, the second estimator may use a set of rules that instruct the controller 630 to perform an action and monitor a result of that action, which should be a reduction or increase of an associated value. For example, the controller 630 may implement the rule based approach by decreasing the target induced voltage $EMF_{SET}$. Such a decrease in the induced voltage $EMF_{SET}$ may result in the PTU 605 reducing its transmit current $I_{tx}$. The PRU controller 630 may continue to decrease the target induced voltage $EMF_{SET}$ until the controlled synchronous rectifier 620 has a control phase of zero, which may lead to greater efficiency as compared to operating the controlled synchronous rectifier with a phase offset. Accordingly, such a rule implemented by the controller 630 may be "decrease $EMF_{SET}$ until the phase=0" or something similar. In some implementations, the first estimator and the second estimator may be combined into a single estimator that is capable of selecting one or more estimator models dependent on the system state of the PRU 600.

Figure 7:
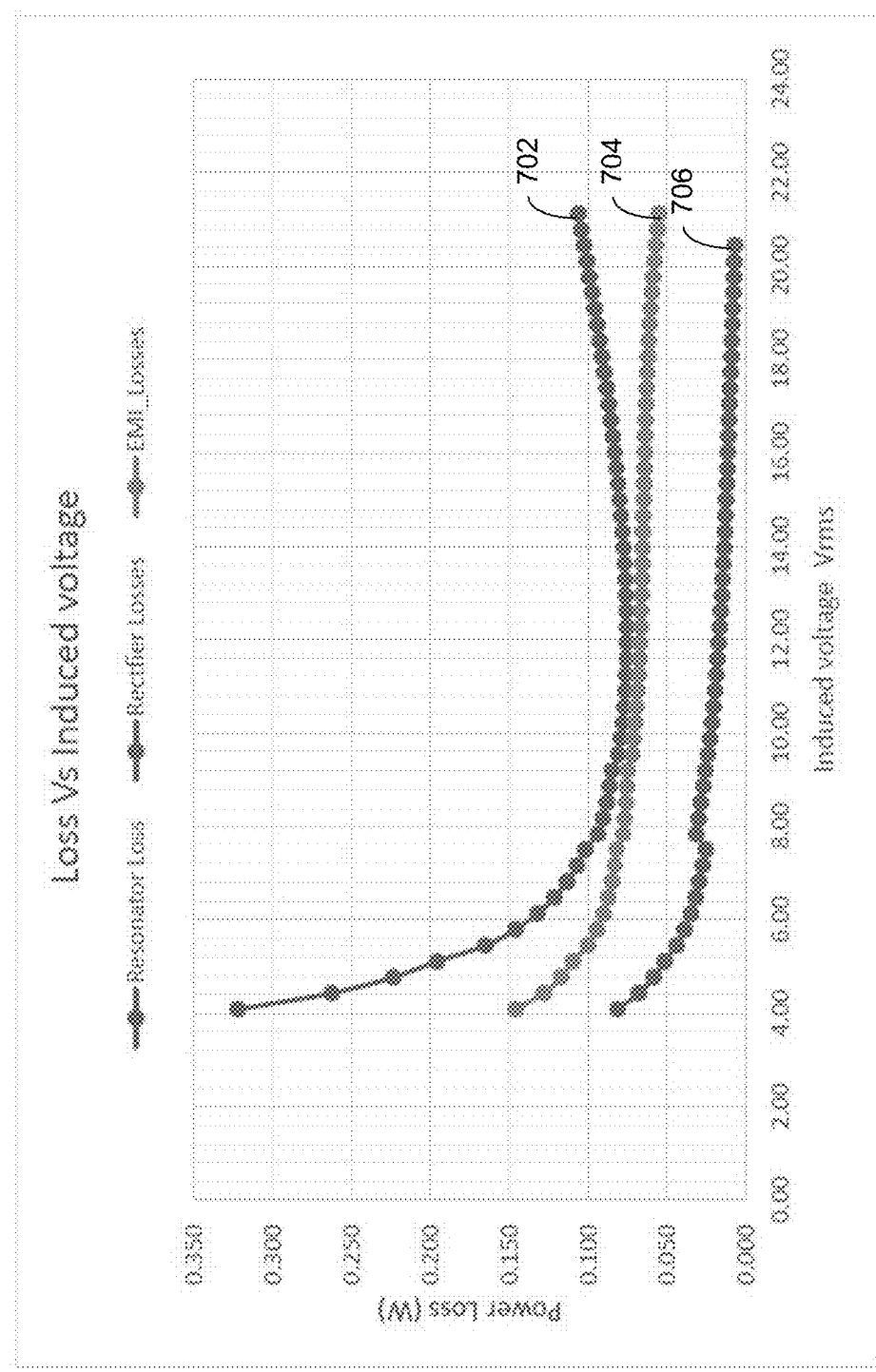
FIG. 7 is graph of power losses of the PRU (broken down into resonator losses, rectifier losses, and EMI filter losses) as a function of induced voltage, for a specific system state of the PRU, in accordance with exemplary implementations of the invention.

In some implementations, the PRU 600 further comprises a communication circuit. The communication circuit may be configured to communicate one or both of the estimated induced voltage $EMF_{FB}$ and the estimated target induced voltage $EMF_{SET}$. In some implementations, the PTU 605 receives the two values ($EMF_{FB}$ and $EMF_{SET}$) to replace an expected $V_{rect}$ and $V_{rectset}$ (corresponding to a PRU 600 desired rectified voltage). In some implementations, the communication circuit comprises a Bluetooth or Wi-Fi module. In some implementations, the communication circuit comprises another controller or the impedance adjustment circuit 610 that communicates with the PTU 605 via inband signaling. In some implementations, the communication circuit associates the estimated induced voltage and estimated target induced voltage with legacy $V_{rect}$ values to enable communications with legacy PTUs 605. In some implementations, the PRU 600 communicates current values, signals (e.g., bits or flags) indicating overvoltage or other potentially harmful conditions, and similar values and/or indicators to the PTU 605 that pertain to the wireless charging relationship between the PTU 605 and the PRU 600. FIG. 7 is a graph 700 of power losses of the PRU 600 (broken down into resonator losses—702, rectifier losses—706, and EMI filter losses—704) as a function of induced voltage, for a specific system state of the PRU 600, in accordance with exemplary implementations of the invention. The graph 600 shows power losses in watts (W) on the y-axis and induced voltage in volts (V) on the x-axis.

Line 702 (corresponding to resonator losses) of graph 700 shows a power loss of approximately 0.325 W at an induced voltage of approximately 4V. Line 702 shows that the power loss decreases as the induced voltage increases until the induced voltage is between 10 and 14V. Between 10 and 14V, the power losses are roughly level at approximately 0.075 W. Above 14V, line 702 shows the power loss begins to increase as the induced voltage increases. At approximately 21V, the power loss has increased to approximately 0.11 W and continues increasing as the induced voltage increases.

Line 704 (corresponding to EMI filter losses) of graph 700 shows a power loss of approximately 0.150 W at an induced voltage of approximately 4V. Line 704 shows that the power loss due to the EMI filter generally continuously decreases as the induced voltage increases. At approximately 21V, the power loss has decreased to approximately 0.050 W and continues decreasing as the induced voltage increases.

Line 706 (corresponding to rectifier losses) of graph 700 shows a power loss of approximately 0.080 W at an induced voltage of approximately 4V. Line 706 shows that the power loss due to the rectifier generally continuously decreases as the induced voltage increases. At approximately 21V, the power loss has decreased to approximately 0.010 W and continues decreasing as the induced voltage increases.

The graph 700 of FIG. 7 thus shows that operating at a target induced voltage $EMF_{SET}$ may provide for reduced losses at the PRU 600 because losses due to the resonator, the rectifier, and interference can be minimized. For example, graph 700 may indicate that the target induced voltage $EMF_{SET}$ may be between 10 and 14V, where the resonator loss (line 702) is at its minimum value and where the rectifier losses (line 704) and interference losses (line 706) are close to their minimum values. For example, the target induced voltage EMFSET may correspond to a voltage within a threshold range (e.g., above and below minimum and maximum threshold values, respectively) at which combined losses due to the resonator, rectifier, and interference are within 0.1 W of their minimum values.

Figure 8:
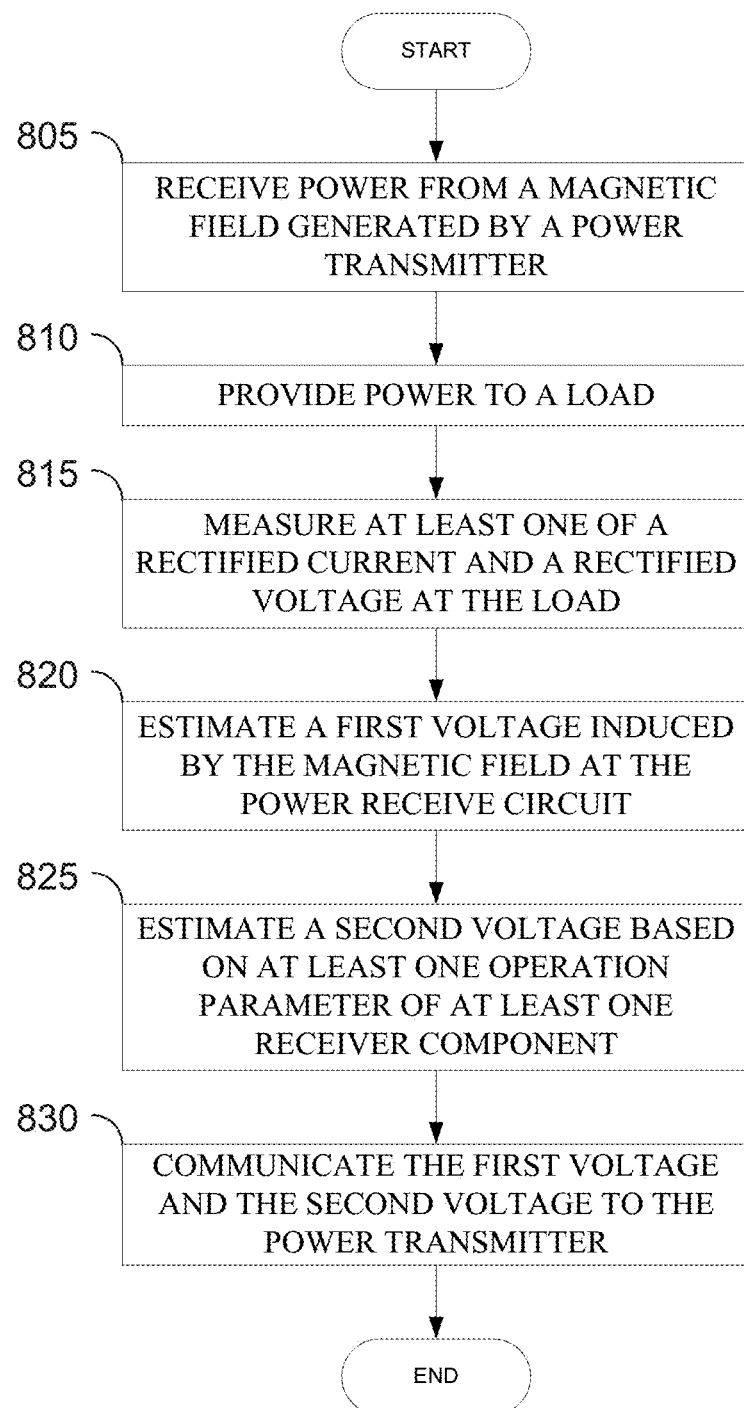
FIG. 8 is a flowchart includes a plurality of steps of a method of estimating an induced voltage and a target or optimal induced voltage of the receiver, in accordance with exemplary implementations of the invention.

FIG. 8 is a flowchart includes a plurality of steps of a method 800 of estimating an induced voltage of the receiver (PRU) 600, in accordance with exemplary implementations of the invention. For example, the method 800 could be performed by the PRU 500 illustrated in FIG. 5. Method 800 may also be performed by the PRU 600 of FIG. 6 in some implementations. A person having ordinary skill in the art will appreciate that the method 800 may be implemented by other suitable devices and systems. Although the method 800 is described herein with reference to a particular order, in various implementations, blocks herein may be performed in a different order, or omitted, and additional blocks may be added.

The method 800 begins at operation block 805 with the PRU 600 receiving power from a magnetic field generated by a power transmitter (PTU). In some implementations, the PRU 600 may receive charging power that is then provided to a load at operation block 810. In some implementations, the power is used to charge the load (e.g., a battery or storage cell). In some implementations, the power is used to directly power electronics of the PRU 600.

At operation block 815, the PRU 600 measures at least one of a rectified current and a rectified voltage at the load. In some implementations, the rectified current and the rectified voltage may be measured by a dedicated current and/or voltage measuring component (not shown). In some implementations, the rectified current and/or the rectified voltage may be measured at the rectifier, e.g., the synchronous rectifier 620).

At operation block 820, the PRU 600 estimates a first voltage induced by the magnetic field at the PRU 600. In some implementations, the first voltage estimate may be based at least in part on at least one of the measured current and the measured voltage. In some implementations, the first voltage estimate may be further based at least in part on at least one operation parameter of at least one receiver component of the PRU 600. For example, the at least one operation parameter comprises one or more of a capacitance, an inductance, a duty cycle, and a phase of the at least one receiver component (e.g., the synchronous rectifier 620 or the impedance adjustment circuit 610) when the controller estimates the first voltage.

At operation block 825, the PRU 600 estimates a second voltage based on at least the one operation parameter of the at least one receiver component. In some implementations, the second voltage corresponds to a voltage at which the power receiver circuit operates with an efficient level that exceeds a threshold efficiency. In some implementations, the at least one operation parameter comprises one or more of parameters listed above At operation block 830, the PRU 600 communicates the first voltage and the second voltage to the power transmitter (e.g., PTU 400). In some implementations, the PRU 600 communicates the first and second voltages to the PTU 400 via the antenna 605. In some implementations, the antenna 605 may communicate the first and second voltages via backscatter or in-band signaling. In some implementations the antenna 605 (or another antenna of the PRU 600, not shown) may communicate the first and second voltages to the PTU 400 via any communications means or standard (e.g., Bluetooth, Wi-Fi, near-field communication (NFC), etc.).

An apparatus for wirelessly receiving power may perform one or more of the functions of method 800, in accordance with certain implementations described herein. The apparatus may comprise means for receiving power from a magnetic field generated by a power transmit unit. In certain implementations, the means for receiving power from a magnetic field generated by a power transmit unit can be implemented by the receive antenna 504 (FIG. 5) or the antenna 605. In some implementations, the means for receiving power from a magnetic field generated by a power transmit unit can be implemented by the PRU 600. In certain implementations, the means for receiving power from a magnetic field generated by a power transmit unit can be configured to perform the functions of block 805 (FIG. 8). The apparatus may further comprise means for providing power to a load. In certain implementations, the means for providing power to a load can be implemented by one or more receiver components of the apparatus or the PRU 600. In certain implementations, the means for providing power to a load can be configured to perform the functions of block 810 (FIG. 8).

The apparatus may further comprise means for measuring at least one of a current and a voltage at the load. In certain implementations, the means for measuring at least one of a current and a voltage at the load can be implemented by at least one sensor. In some implementations, the means for measuring at least one of a current and a voltage at the load can be implemented by the controller 630. In certain implementations, the means for measuring at least one of a current and a voltage at the load can be configured to perform the functions of block 815 (FIG. 8). The apparatus may further comprise means for estimating a first voltage induced by the magnetic field based on the at least one measured current and measured voltage and at least one operation parameter of at least one receiver component. In certain implementations, the means for estimating the first voltage can be implemented by the controller 630 of the PRU 600. In certain implementations, the means for estimating the first voltage can be configured to perform the functions of block 820 (FIG. 8).

The apparatus may further comprise means for estimating a second voltage based on the at least one operation parameter of the at least one receiver component, the second voltage corresponding to a voltage at which the means for receiving power operates with an efficiency level that exceeds a threshold efficiency. In certain implementations, the means for estimating the second voltage can be implemented by the controller 630 of the PRU 600. In certain implementations, the means for estimating the second voltage can be configured to perform the functions of block 825 (FIG. 8). The apparatus may further comprise means for communicating the first voltage and the second voltage to the power transmit unit. In certain implementations, the means for communicating can be implemented by the antenna 605 or a communication circuit of the PRU 600 (not shown). In certain implementations, the means for communicating can be configured to perform the functions of block 830 (FIG. 8).

In some embodiments, an apparatus for receiving wireless power may comprise, in some implementations, the PRU 600 of FIG. 6 and the PRU 600 may perform associated functions and methods.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specified Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features s have been described herein. It is to be understood that not necessarily all such advantages may be achieved in accordance with any particular implementation. Thus, the present disclosure may be embodied or carried out in a manner that achieves or optimizes one advantage or group of advantages as taught herein without necessarily achieving other advantages as may be taught or suggested herein.

Various modifications of the above-described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for receiving wireless power, comprising:
   a power receiver circuit configured to:
      receive power from a magnetic field generated by a power transmitter, and
      provide power to a load;
   at least one receiver component operating with the power receiver circuit based, at least in part, on at least one operation parameter;
   at least one sensor configured to measure at least one of a current and a voltage at the load;
   a controller configured to:
      estimate a first voltage induced by the magnetic field at the power receiver circuit based on the at least one measured current and measured voltage and the at least one operation parameter of the at least one receiver component, the power receiver circuit operating with a first amount of power loss when the first voltage is induced, and
      estimate a second voltage based on the at least one operation parameter of the at least one receiver component, the second voltage corresponding to a voltage at which the power receiver circuit operates with an efficiency level that exceeds a threshold efficiency and with a second amount of power loss that is less than the first amount of power loss; and
   a communication circuit configured to communicate the first voltage and the second voltage to the power transmitter and cause the power transmitter to operate based on the second voltage.

2. The apparatus of claim 1, wherein the at least one operation parameter comprises one or more of a capacitance, an inductance, a duty cycle, and a phase of the at least one receiver component when the controller estimates at least one of the first voltage and the second voltage.

3. The apparatus of claim 1, wherein the controller is further configured to convert at least one of the estimated first voltage and the estimated second voltage to a format or value for communication to the power transmitter.

4. The apparatus of claim 1, wherein the controller estimates at least one of the first voltage and the second voltage based at least in part on an estimator model, the estimator model including variables for a measured current, a measured voltage, and the at least one operation parameter of the at least one receiver component.

5. The apparatus of claim 4, wherein the controller is further configured to generate the estimator model based on at least one of a simulation or a hardware prototype of the apparatus.

6. The apparatus of claim 1, wherein the controller estimates at least one of the first voltage and the second voltage based at least in part on a look-up table, the look-up table including entries for measured currents, measured voltages, and the at least one operation parameter of the at least one receiver component.

7. The apparatus of claim 6, wherein the controller is further configured to generate the look-up table based on at least one of a simulation or a hardware prototype of the apparatus.

8. The apparatus of claim 1, wherein the estimated second voltage corresponds to a voltage at which combined losses by the power receiver circuit and the at least one receiver component are below a threshold value.

9. The apparatus of claim 1, wherein the controller estimates the second voltage by, at least in part, adjusting the estimated second voltage until the at least one operation parameter of the at least one receiver component reaches a threshold value.

10. A method for receiving wireless power at a power receive unit, comprising:
receiving power, via a power receive circuit, from a magnetic field generated by a power transmit unit;
providing power to a load;
measuring at least one of a current and a voltage at the load;
estimating a first voltage induced by the magnetic field based on the at least one measured current and measured voltage and at least one operation parameter of at least one receiver component, the power receive unit operating with a first amount of power loss when the first voltage is induced;
estimating a second voltage based on the at least one operation parameter of the at least one receiver component, the second voltage corresponding to a voltage at which the power receive circuit operates with an efficiency level that exceeds a threshold efficiency and with a second amount of power loss that is less than the first amount of power loss;
communicating the first voltage and the second voltage to the power transmit unit;
causing the power transmit unit to operate based on the second voltage.

11. The method of claim 10, wherein the at least one operation parameter comprises one or more of a capacitance, an inductance, a duty cycle, and a phase of the at least one receiver component when the at least one of the first voltage and the second voltage is estimated.

12. The method of claim 10, further comprising converting at least one of the estimated first voltage and the estimated second voltage to a format or value for communication to the power transmit unit.

13. The method of claim 10, further comprising estimating at least one of the first voltage and the second voltage based at least in part on an estimator model, the estimator model including variables for a measured current, a measured voltage, and the at least one operation parameter of the at least one receiver component.

14. The method of claim 13, further comprising generating the estimator model based on at least one of a simulation or a hardware prototype of the power receive unit.

15. The method of claim 10, further comprising estimating at least one of the first voltage and the second voltage based at least in part on a look-up table, the look-up table including entries for measured currents, measured voltages, and the at least one operation parameter of the at least one receiver component.

16. The method of claim 15, further comprising generating the look-up table based on at least one of a simulation or a hardware prototype of the power receive unit.

17. The method of claim 10, wherein the estimated second voltage corresponds to a voltage at which combined losses by the at least one receiver component is below a threshold value.

18. The method of claim 10, wherein the second voltage is estimated by, at least in part, adjusting the estimated second voltage until the at least one operation parameter of the at least one receiver component reaches a threshold value.

19. An apparatus for receiving wireless power, comprising:
means for receiving power from a magnetic field generated by a power transmit unit;
means for providing power to a load;
means for measuring at least one of a current and a voltage at the load;
means for estimating a first voltage induced by the magnetic field based on the at least one measured current and measured voltage and at least one operation parameter of at least one receiver component, the means for receiving power operating with a first amount of power loss when the first voltage is induced;
means for estimating a second voltage based on the at least one operation parameter of the at least one receiver component, the second voltage corresponding to a voltage at which the means for receiving power operates with an efficiency level that exceeds a threshold efficiency and with a second amount of power loss that is less than the first amount of power loss;
means for communicating the first voltage and the second voltage to the power transmit unit; and
means for causing the power transmit unit to operate based on the second voltage.

20. The apparatus of claim 19, wherein the at least one operation parameter comprises one or more of a capacitance, an inductance, a duty cycle, and a phase of the at least one receiver component when the at least one of the first voltage and the second voltage is estimated.

21. The apparatus of claim 19, further comprising means for converting at least one of the estimated first voltage and the estimated second voltage to a format or value for communication to the power transmit unit.

22. The apparatus of claim 19, further comprising means for estimating at least one of the first voltage and the second voltage based at least in part on an estimator model, the estimator model including variables for a measured current, a measured voltage, and the at least one operation parameter of the at least one receiver component.

23. The apparatus of claim 22, further comprising means for generating the estimator model based on at least one of a simulation or a hardware prototype of the power receive unit.

24. The apparatus of claim 19, further comprising means for estimating at least one of the first voltage and the second voltage based at least in part on a look-up table, the look-up table including entries for measured currents, measured voltages, and the at least one operation parameter of the at least one receiver component.

25. The apparatus of claim 24, further comprising means for generating the look-up table based on at least one of a simulation or a hardware prototype of the power receive unit.

26. The apparatus of claim 19, wherein the estimated second voltage corresponds to a voltage at which combined losses by the at least one receiver component is below a threshold value.

27. The apparatus of claim 19, wherein the second voltage is estimated by, at least in part, adjusting the estimated second voltage until the at least one operation parameter of the at least one receiver component reaches a threshold value.

* * * * *